United States Patent [19]

King

[11] 4,395,250
[45] Jul. 26, 1983

[54] TENSIONING DEVICES

[75] Inventor: Alan G. King, Bedfordshire, England

[73] Assignee: Borg-Warner Limited, Letchworth, England

[21] Appl. No.: 230,028

[22] Filed: Jan. 30, 1981

[30] Foreign Application Priority Data

Sep. 29, 1980 [GB] United Kingdom ............... 8031352

[51] Int. Cl.³ .............................................. F16H 7/08
[52] U.S. Cl. ..................................... 474/111; 474/140
[58] Field of Search ....................... 474/111, 133–135, 474/140; 254/8 B

[56] References Cited

U.S. PATENT DOCUMENTS

| 3,426,606 | 2/1969 | Hopkins | 474/111 |
| 3,463,025 | 8/1969 | Turner et al. | 474/111 |
| 4,314,691 | 2/1982 | Sato | 254/8 B |

FOREIGN PATENT DOCUMENTS

| 323697 | 1/1930 | United Kingdom | 474/111 |
| 1380801 | 1/1975 | United Kingdom | 474/111 |

Primary Examiner—John E. Murtagh
Assistant Examiner—Richard E. Chilcot, Jr.
Attorney, Agent, or Firm—Aubrey L. Burgess

[57] ABSTRACT

A chain tensioning device comprises a pair of arms 2, 3 which are pivoted together and urged apart, so that the arm 3 applies a tensioning force to a chain, by means of a block 9 biased by a compression spring 10 axially along the arm 2 in conjunction with links 14 coupled between the block 9 and the arm 3 and serving to pivot the arm 3 relative to the arm 2, in response to such spring biased axial movement of the block 9. A catch disc 12 and rod 6 arrangement is provided to prevent return movement of the spring loaded block 9 and hence collapse of the arm 3 under load reversals of the chain.

9 Claims, 7 Drawing Figures

TENSIONING DEVICES

This invention relates to tensioning devices for endless driving elements such as chains and belts.

In our co-pending United Kingdom patent application No. 8004449 we have described and illustrated an embodiment of a tensioning device in which a pair of arms are pivoted together at one end and are urged apart by means of a cam block being spring loaded towards the pivot so as to exert a wedge action between the two arms. The cam block and the spring are mounted on a guide rod which is supported by one of the arms, and in order to provide a resistance to load reversals in the driving element being tensioned, a catch disc is mounted on the guide rod and is arranged to tilt and bind thereagainst so as to prevent return movement of the cam block against the spring bias and consequent collapse of the arm being acted upon by the wedging action of the cam block. To prevent overloading of the tensioned driving element, a degree of lost motion is provided in the tensioning device by the guide rod being permitted to slide relative to the arm which supports it to a predetermined limited extent so that the guide rod will slide forwardly as the cam block moves under the spring bias towards the pivot and then, when the catch disc binds against it, will slide rearwardly as one with the catch disc and cam block to reduce the tension in the driving element.

We have now devised alternative embodiments of tensioning devices which are designed to provide a resistance to load reversals in the driving element being tensioned and to prevent overloading of the tensioned driving element but which instead of using the wedging action of a spring loaded cam block to urge a pivoted arm into tensioning engagement with the drive element uses a member which is spring loaded away from the pivoted end of such an arm and which acts through a link means pivoted to the arm to swing the arm in a tensioning sense.

In order that the invention may be well understood the aforesaid alternative embodiments of tensioning device, which are given by way of example of the present invention, will now be described with reference to the accompanying drawings, in which.

Figure 1:
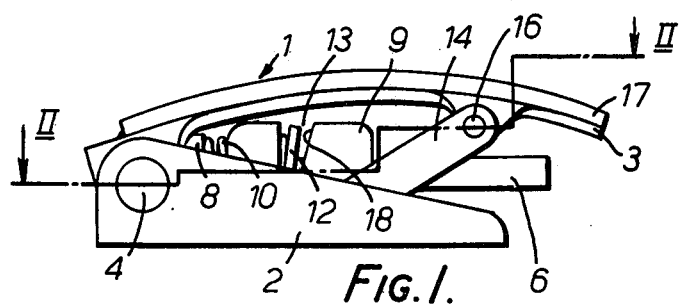
FIG. 1 is a side elevation of one embodiment of tensioning device.
Figure 2:
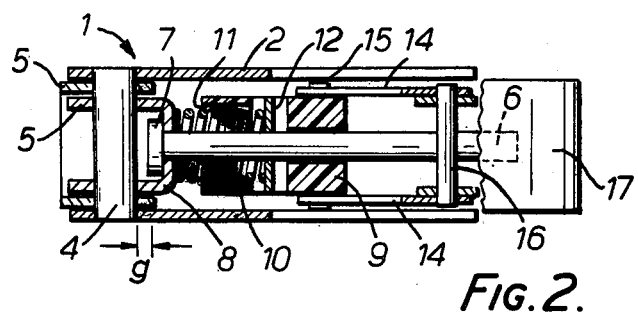
FIG. 2 is a section along the line II—II of FIG. 1.
Figure 3:
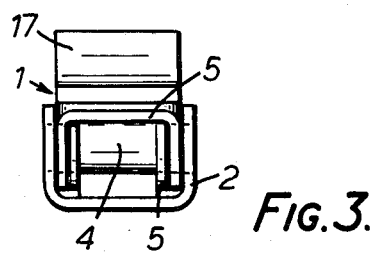
FIG. 3 is an end elevation of the same tensioning device.
Figure 4:
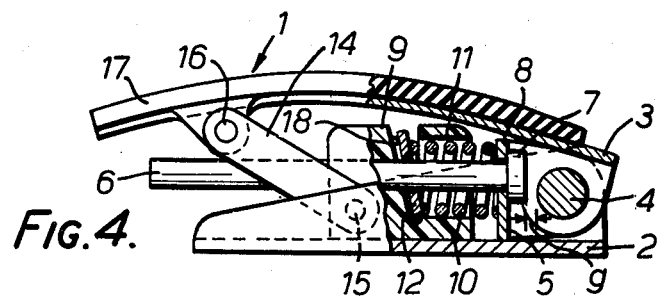
FIG. 4 is a part sectional side elevation of the same tensioning device.

As shown in FIGS. 1 to 4, a tensioning device 1 has a pair of lower and upper arms 2 and 3, respectively, which are pivoted together at one end by a pivot pin 4. An intermediate arm 5 is pivotally mounted about the pin 4 and supports a rod 6 which extends generally parallel to the lower arm 2. The rod 6 has an enlarged end 7 which engages behind an abutment flange 8 of the arm 5 and is spaced a gap g from the pin 4. A block 9 is apertured by which to be slidably mounted on the rod 6 and is urged therealong away from the pin 4 by a compression spring 10. The spring 10 is mounted about the rod 6 to engage at one end the abutment flange 8 and to extend at the other end through an apertured region 11 of the block 9 to engage a catch disc 12 mounted in a transverse recess 13 of the block. Finally, a pair of links 14 are coupled between the block 9 and the upper arm 3 to pivot that arm relative to the lower arm 2 as the block is urged along the rod 6 by the spring 10 acting on the block via the catch disc 12. The links 14 are connected to the block 9 and the upper arm 3 by pivot pins 15 and 16, respectively.

Figure 5:
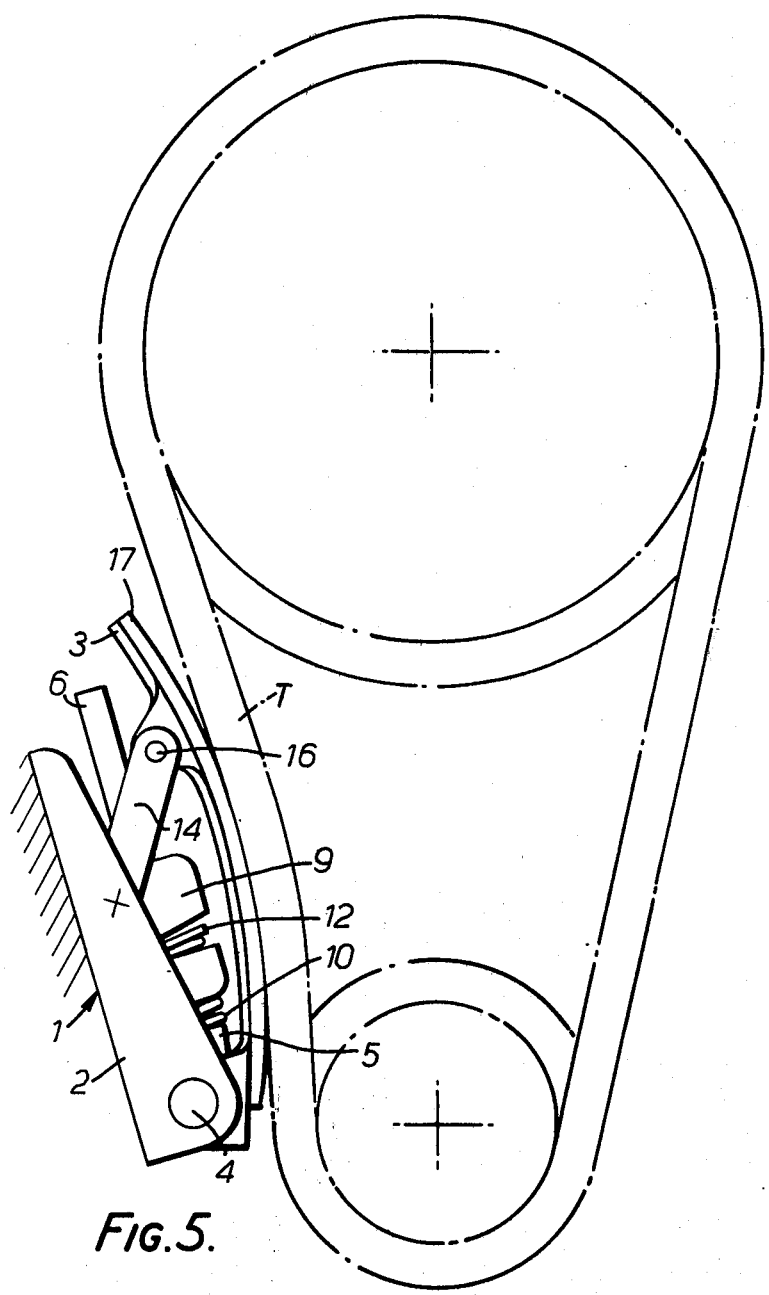
FIG. 5 is a side elevation of the same tensioning device directly tensioning a chain drive.

When the tensioning device 1 is used to tension the timing chain of an engine, the lower arm 2 would be suitably mounted on the engine and affixed in position. The upper arm 3 would then be swung about the pivot pin 4 relative to the lower arm 2 under the biasing action of the coil spring 10 urging, through the catch disc 12, the block 9 along the rod 6, and the block, in turn, acting on the links 14 to move their lower ends forward and so exert a turning moment on the upper arm. The upper arm 3 may have a shoe in the form of a rubbing face 17 directly moulded upon it and of, for example, rubber or nylon. As shown in FIG. 5, that rubbing face 17 directly engages the timing chain T thereby tensioning it.

As will be realised, the spring loading decreases the more the spring 10 is extended. However, the further the block 9 moves along the rod 6 under the spring bias, the more the links 14 are oriented towards the vertical. Therefore, the greater is the vertical component of the biasing force acting to swing the upper arm 3. Accordingly, the construction affords a degree of compensation for the gradual decrease in spring loading available to pivot the upper arm 3 and so tension the timing chain T.

The construction of the tensioning device 1 also provides resistance to load reversals in the timing chain T. First, any tendency of the upper arm 3 to collapse under a sudden reversal of movement of the chain will give rise to a vertical force component acting through the links 14 on the block 9 so causing the block to bind against the rod 6. Furthermore, the block recess 13 has its front face 18 angled so that as the block 9 returns along the rod 6 against the bias of the spring 10, its angled face will tilt the catch disc 12 relative to the rod so that it will bind against it thereby preventing further return movement of the block.

Effectively, at that time the block 9, catch disc 12 and rod 6 can only move as one unit. Because of gap g between the enlarged end 7 of the rod 6 and the pin 4, a restricted degree of rearward movement is available to the rod and hence the aforesaid unit. Thereby, a degree of lost motion is provided in the tensioning device serving to prevent overloading of the chain T, the size of the gap g determining the extent of that lost motion and hence the degree by which the upper arm 3 can collapse under the chain loading.

When the overloading condition is removed, the spring bias acting on the catch disc 12 will tilt the disc upright so freeing it from its locking frictional engagement with the rod 6 and will urge the block 9 along the rod so causing the links 14 to pivot the upper arm 3 outwardly. Through frictional drag the rod 6 will be carried forward until its enlarged end 7 again contacts the abutment flange 8, so that scope again exists for a degree of retraction of the upper arm 3 as determined by the size of the gap g.

The catch disc 12 and the block 9 would be suitably fashioned to enable the catch disc to be tilted upright by a suitable tool and so freed from its locked condition as and when required.

The links 14 act as levers and hence by varying their lengths different leverages can be imposed on the outer arm 3 for the same strength of compression spring. Thus, lighter springs could be used by increasing the lengths of the links 14. Varying the link length will also give different take ups for wear in the chain. Again, as the length of the chain is increased, the length of the upper arm 3 could also be increased in which case the links 14, acting as support struts, would be suitably lengthened to give support for the arm near to its free end.

Figure 6:
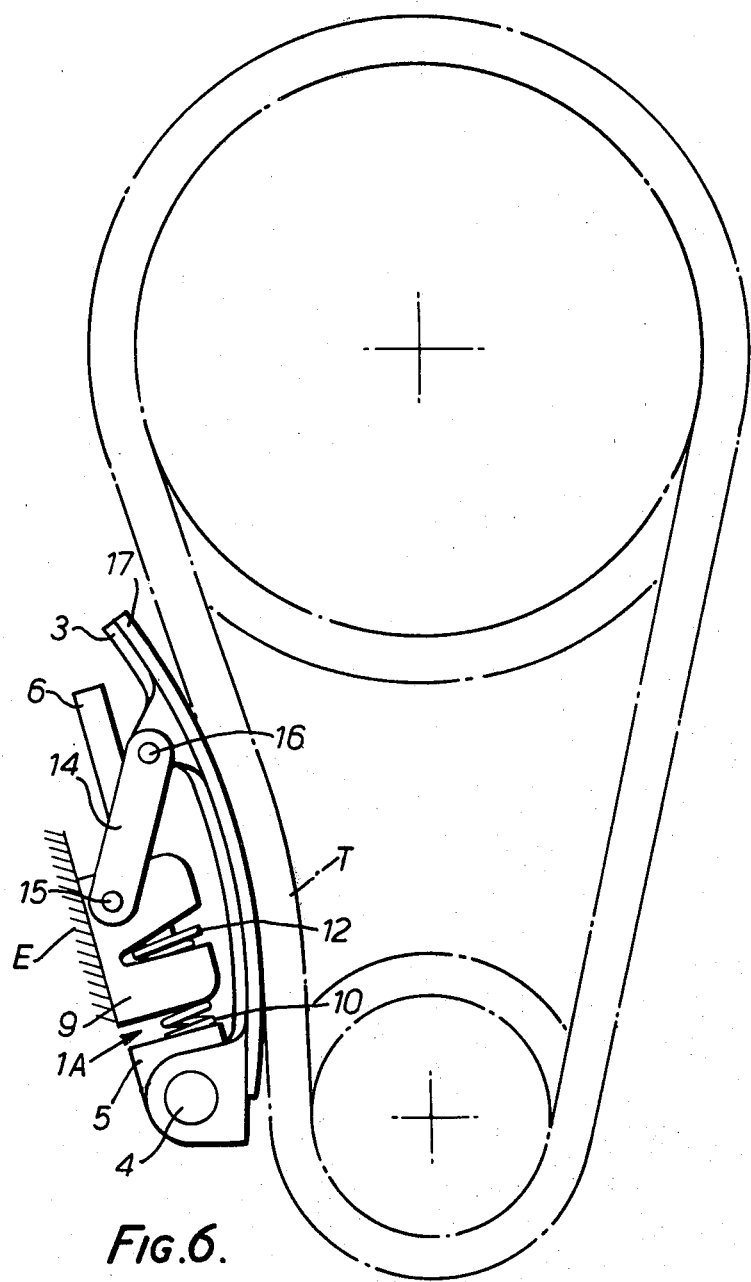
FIG. 6 is a side elevation of a second embodiment of tensioning device shown directly tensioning a chain drive.

It is not absolutely necessary that there should be a lower arm 2, and FIG. 6 shows a tensioning device 1A which omits such an arm. The function of a lower arm is to act as a support surface on which the block 9 can slide and as a means for mounting the tensioning device to the engine. The former function could be provided by suitable fashioning of the engine structure E or, for example, by a flange of an angle bracket affixed to that structure. The latter function could be served by mounting the ends of the pivot pin 4 in a support means integral with or affixed to the engine structure.

Figure 7:
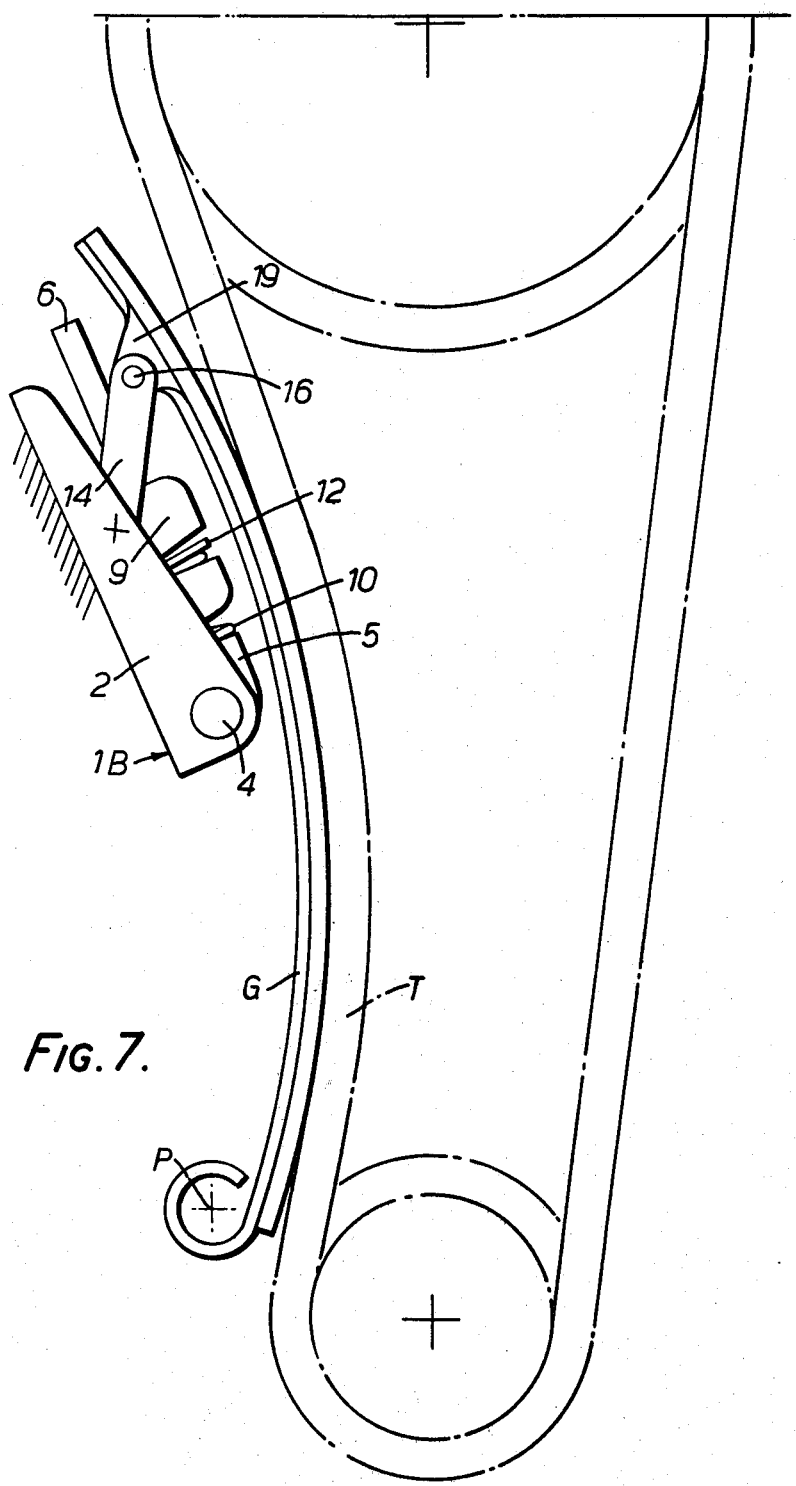
FIG. 7 is a side elevation of a third embodiment of tensioning device when used to tension a longer chain drive.

The upper arm 3 could also be omitted in the case of a long length chain T as shown in FIG. 7. Here, a guide strip G which is pivoted at P has a tensioning device 1B mounted near to its free end. That device is similar to the tensioning device of FIGS. 1 to 4 except that the links 14 instead of being pivoted to an upper arm are pivoted at 16 direct to the guide strip G itself which is fashioned with depending lugs 19 for that purpose.

As an alternative, the tensioning device 1 of FIGS. 1 to 4 could have its upper arm 3 abut the guide strip G so that as the arm is pivoted outwards it will pivot the guide strip into tensioning engagement with the chain T.

As variations, the lower arm could be fashioned so as to wrap around the engine block rather than being a channel section, as shown. The intermediate arm could be formed as a suitably shaped block produced as a moulding or casting. The various components may be manufactured similarly to their counterparts in our aforementioned application.

When the intermediate arm is formed as a block, the lost motion available to the guide rod could be provided by the rod having a head engaging in an elongated slot in the block, the length of the slot determining the degree of lost motion available.

I claim:

1. A tensioning device for an endless driving element, comprising a pivoted arm, a rod, an actuator slidably mounted on said rod, compression spring means mounted about said rod and biasing said actuator in one axial direction along said rod, link means coupled between said actuator and said pivoted arm by which to convert axial movement of said actuator into pivotal movement of said arm, and vice versa, said arm being caused to pivot in a tensioning sense in response to spring biased movement of said actuator in said one direction, a catch disc mounted on said rod and tiltable into binding engagement therewith in response to return movement of said arm, by which to inhibit said return movement of said actuator and hence said return pivotal movement of said arm, and a shoe adapted to directly engage the endless driving element and connected to said pivoted arm.

2. A tensioning device as claimed in claim 1, including means permitting a limited extent of axial movement of said rod by which to permit a limited extent of return movement of said actuator when said catch disc is tilted into binding engagement with said rod and hence permit a limited degree of return pivotal movement of said arm, and in which said actuator has an angled face adjacent said catch disc such as to effect said tilting of said catch disc into binding engagement with said rod in response to said return movement of said actuator.

3. A tensioning device as claimed in claim 2, wherein said catch disc is positioned in a recess in said actuator, said recess being defined by a pair of walls, said angled face defining one of said walls of said recess, said compression spring extending through the other wall of said recess to impart its spring bias to said catch disc and thence to said actuator, said spring biasing said actuator away from the pivotal axis of said arm.

4. A tensioning device as claimed in claim 3, including an arm member mounted on a pivot pin and slidably supporting an inner end of said rod, said rod having stop means thereon cooperating with said pivot pin and said arm member by which together therewith to constitute said rod limiting movement means to permit said limited extent of axial movement of said rod.

5. A tensioning device as claimed in claim 4, wherein said spring means is mounted between said arm member and said catch disc.

6. A tensioning device as claimed in claim 5, wherein said pivoted arm is also mounted on said pivot pin by which to be pivotable in said tensioning and return senses.

7. A tensioning device as claimed in claim 6, including a second arm having means by which to mount said tensioning device to a support, said second arm also being mounted on said pivot pin, said actuator being slidably mounted on said second arm.

8. A tensioning device as claimed in claim 5, wherein said pivoted arm has its pivotal axis remote from said pivot pin and constitutes a guide strip which, in use of said tensioning device, applies a tensioning force direct to the endless driving element.

9. A tensioning device as claimed in claim 8 including a second arm having means by which to mount said tensioning device to a support, said second arm also being mounted on said pivot pin, said actuator being slidably mounted on said second arm.

* * * * *